United States Patent [19]

Rosback

[11] 3,718,580

[45] Feb. 27, 1973

[54] ABSORBING OLEFINS WITH A COPPER-EXCHANGED TYPE X ZEOLITE

[75] Inventor: Donald H. Rosback, Elmhurst, Ill.

[73] Assignee: Universal Oil Products Company, Des Plains, Ill.

[22] Filed: Aug. 16, 1971

[21] Appl. No.: 172,323

Related U.S. Application Data

[62] Division of Ser. No. 865,979, Oct. 13, 1969, Pat. No. 3,649,176.

[52] U.S. Cl. .............................. 208/310, 260/677 A
[51] Int. Cl. ............................................ C10g 25/04
[58] Field of Search .................... 208/310; 260/677 A

[56] References Cited

UNITED STATES PATENTS 3,510,423  5/1970  Neuzil et al. ......................... 208/310

Primary Examiner—Herbert Levine
Attorney—James R. Hoatson, Jr. and Robert W. Erickson

[57] ABSTRACT

A new composition of matter, a method for the preparation of a copper-exchanged Type X structured zeolite and a separation process employing the same. The zeolite sorbent is prepared by a procedure employing an aqueous ion exchange step and a final activation step including contacting a copper-exchanged zeolite with a mixture containing a cuprous salt and a hydrocarbon. The process involves the selective separation of olefinic hydrocarbons from saturated hydrocarbons and employs a Type X structured zeolite containing copper cations at a portion of the cationic exchange sites within the zeolite. The olefins are selectively retained by the sorbent and are removed in a concentrated form by a desorption step.

5 Claims, No Drawings

ABSORBING OLEFINS WITH A COPPER-EXCHANGED TYPE X ZEOLITE

This is a divisional application of pending application Ser. No. 865,979, filed on Oct. 13, 1969 now U.S. Pat. No. 3,649,176.

BACKGROUND OF THE INVENTION

1. Field of the invention

This invention relates to a new composition of matter, the manufacture of zeolite sorbent and a separation process employing the same. More specifically, this invention relates to the production of a zeolite sorbent having a reduced catalytic activity towards the olefinic materials being adsorbed by the sorbent. This invention also relates to a hydrocarbon separation process employing a specially-prepared sorbent to effectively separate olefins from feed streams containing saturates and olefins in an efficient manner using a sorbent having a low activity towards polymerization and isomerization of the olefins being adsorbed by the sorbent.

2. Description of the Prior Art

It is well known in the separation art that molecular sieve sorbents can be employed to separate olefins from saturates. The sorbents employed in the separation processes are generally crystalline aluminosilicates modified with a selective material from the groups generally consisting of the I–A, II–A, and I–B metals of the Periodic Table of The Elements. In most cases, the metals are ion-exchanged onto the zeolite by known methods and generally effect an increase in capacity of the sieves for the adsorption of olefinic materials. The method of this invention places copper cations in a Type X structured zeolite to effect the reduction in polymerization and isomerization activity generally associated with the sodium form Type X structured zeolites when employed to selectively adsorb olefins from a feed stream mixture. I have found that through the use of a novel treatment that a Type X structured zeolite which has been exchanged with a first aqueous copper solution and which has been subsequently contacted with a mixture of a hydrocarbon and a cuprous salt solution, that the polymerization and isomerization activities which generally appear can be eliminated leaving the sieve in a state of reduced catalytic activity.

The prior art in general has not recognized the effects of copper on the olefins being adsorbed within a copper exchange sorbent. Since the copper-exchange Type X structured zeolite generally causes side reactions to occur, thereby reducing the efficiency of a separation process employing that type sorbent, the method of my invention substantially improves both the sorbent and the process where olefinic hydrocarbons are to be separated efficiently from a feed stream.

SUMMARY OF THE INVENTION

It is an object of the present invention to provide a method for the manufacture of a crystalline aluminosilicate zeolite sorbent which is inert towards polymerization and isomerization of olefinic type hydrocarbons through the use of a production procedure comprising an aqueous ion-exchange step followed by contacting the exchanged zeolite with a mixture comprising a hydrocarbon and cuprous salt solution to condition the zeolite in order to eliminate polymerization and isomerization of adsorbed olefins by the sorbent. It is another object of this invention to provide a process for the separation of olefins from saturated hydrocarbons which process employs a specially-prepared copper-exchanged zeolite to effectively retain a high concentration of olefin hydrocarbons within the zeolite while effectively excluding saturated hydrocarbons which enables a relatively efficient separation to take place via adsorptive separation techniques.

It is another object of the present invention to provide a composition of matter comprising copper on a crystalline aluminosilicate.

Both the natural and synthetic varieties of the sodium Type X structured crystalline aluminosilicates may be used as starting materials in the present invention. Crystalline aluminosilicates are essentially cage structured material in which the alumina and silica tetrahedra are intimately connected with each other in an open three-dimensional crystalline network. The tetrahedra are cross-linked by the sharing of atoms of oxygen. The spaces between the tetrahedra are occupied by water molecules prior to dehydration. Subsequent partial or total dehydration of the zeolite results in a crystal structure interlaced with the channels of molecular dimensions. Thus, the crystalline aluminosilicates are often referred to as molecular sieves. In the hydrated form, crystalline aluminosilicates may be represented by the general formula represented in equation 1 below,

$$M_{2/n}O \cdot Al_2O_3 : wSiO_{0:Al_2} : yH_2O \qquad (1)$$

wherein M is a cation which balances the electrovalence of the tetrahedra, n represents the valence of the cation, w represents the mols of $SiO_2$, and y, the mols of water. The Type X zeolite may be represented in terms of the mol ratios of oxides for the sodium form as represented in equation 2 below,

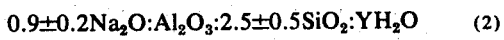

$$0.9 \pm 0.2 Na_2O : Al_2O_3 : 2.5 \pm 0.5 SiO_2 : YH_2O \qquad (2)$$

where Y may be any value up to about 8.

When the sodium form of the Type X zeolite is ion-exchanged with copper, a portion or all of the sodium present within the zeolite structure may be replaced by the copper ions. The copper-exchanged Type X structured zeolites as used in this specification shall generally encompass those zeolites which have been produced according to one aspect of this invention and which may have essentially all of the sodium present within the zeolite originally replaced by a copper cation to those zeolites which have had only a portion of the sodium placed by a copper cation.

In separating the olefinic hydrocarbon from a hydrocarbon mixture containing saturated hydrocarbons and olefinic hydrocarbons, the feed is contacted with a bed of the copper-exchanged sodium Type X structured zeolite, the olefinic hydrocarbon is preferably retained by the sorbent while the unadsorbed or raffinate mixture which comprises saturated hydrocarbons is removed from the interstitial void spaces between the particles of sorbent and the surface of the solid sorbent. The sorbent is then contacted with a desorbent material which is capable of displacing the adsorbed olefinic hydrocarbons from the sorbent.

The sorbent can be contained in a single chamber where through programmed flow into and out of the chamber, separation of the olefinic hydrocarbons is effected. Swing-bed operational techniques, where a series of sorbent chambers are available or simulated moving-bed countercurrent operations similar to those generally disclosed in the pattern of operations as disclosed in U.S. Pat. No. 2,985,589 can be used. In the latter method of operation, the selection of a suitable desorbent requires that it be capable of readily displacing adsorbed olefinic hydrocarbons from the sorbent and also that the olefins in the feed mixture be able to displace the adsorbed desorbent from the sorbent from a previous desorption step.

Charge stocks which may be used in the process of this invention contain olefins in the $C_{10}$—$C_{20}$ carbon range. Of these olefins, the $C_{10}$—$C_{15}$ range is particularly preferred for use in the separation process of this invention. The $C_{10}$—$C_{15}$ normal mono-olefins are generally produced by catalytically dehydrogenating a $C_{10}$—$C_{15}$ normal paraffin stream. The effluent stream from the hydrogenation step generally contains about 5 to 25 percent olefins and requires further processing in order to concentrate a normal olefinic hydrocarbon. The desorbents which can be used in the process of this invention will vary depending on the type of operation employed herein. In the swing-bed system in which the preferably adsorbed olefins are removed from the adsorbent by a purge stream, gaseous hydrocarbons or other type gases may be used at elevated temperatures or reduced pressures or both to effectively purge adsorbed olefins from within the sorbent. However, in other type operations which are generally operated at substantially constant pressures and temperatures, the desorbent relied upon must be judiciously selected in order that it may displace the preferred olefin adsorbed from the feed within the adsorbent without unduly preventing the feed olefins from displacing the desorbent in a following adsorption cycle. In cases where liquid phase, substantially iso-thermal and constant pressure operations are effected, it is preferred to use an olefinic or aromatic desorbent. The desorbent may be either a normal mono-olefin or a branched chain mono-olefin depending on the particular olefinic hydrocarbon chosen as the desorbent or an aromatic hydrocarbon such as benzene or toluene. One problem encountered when using straight chain monoolefinic desorbents is that the lower chain mono-olefinic hydrocarbons are generally more tenaciously held by copper-exchanged Type X structured zeolites than the larger weight normal mono-olefinic hydrocarbons found in the feed. This results in difficulties in displacing the desorbent material from the sorbent once the desorbent has displaced the fresh feed olefin which has previously been adsorbed within the copper-exchanged sorbent.

Process operating conditions include adsorption cycle temperatures of from about 25°C. to about 150°C. with desorption cycle temperatures included within the same general limits. Preferably, the desorption and adsorption cycle temperatures are the same. The pressures which may be used are not critical and can vary from below atmospheric up to many atmospheres and preferably for ease of operations below about 1,000 psig. The pressures at which adsorption and desorption operations are effected preferably are substantially the same. Specifically, the adsorption and desorption temperatures and pressures are the same with liquid phase operations especially preferred.

In testing various sorbents to determine their respectable olefinic adsorptive capacity and degree of catalytic activity, a dynamic testing apparatus was employed. The apparatus used consisted of a sorbent chamber of approximately 40 cc. volume having inlet and outlet portions at opposite ends of the chamber. The chamber was contained within a temperature control means, and in addition, pressure control equipment was used to operate the chamber at a constant predetermined pressure. Attached to the outlet line of the chamber was chromatographic analysis equipment which was used to analyze the effluent stream leaving the sorbent chamber.

The following general procedures were used to determine the adsorptive capacity for the various sorbents tested in the chamber. A feed mixture containing 16 volume percent decene-1 diluted with 84 volume percent iso-octane (2,2,4-trimethylpentane) was passed through the sorbent bed until the effluent stream leaving the sorbent chamber was essentially the same composition as the feed stream passing into the inlet of the sorbent chamber, indicating that there was essentially no net transfer between the fluid passing into the sorbent chamber and the material adsorbed by the sorbent. A desorbent stream was then passed into the sorbent chamber through the inlet. The desorbent stream contained approximately 16 volume percent octene-1, 79 volume percent iso-octane and 5 volume percent isopentane, which was used as a tracer in determining the sorption characteristics when using the gas chromatographic analysis equipment. The desorbent was passed through the sorbent chamber at a carefully controlled rate to effect desorption of the adsorbed decene-1 from the sorbent. The gas chromatographic equipment was used to measure the effluent stream during desorption operations. Knowing the composition of the effluent stream and the flow rate of the material passing out of the sorbent chamber, it was possible to determine, for a given quantity of sorbent, the volume of decene-1 that was adsorbed by the sorbent.

In measuring the catalytic activity of a copper-exchanged Type X zeolite, the following procedures were used. The gas chromatographic equipment which was attached to the outlet stream to analyze the material leaving the sorbent chamber was also used to determine the amount of feed olefins (decene-1) which were present in an effluent stream when a constant feed stream was passed over the sorbent at various testing temperatures. The loss of decene-1 as measured by the gas chromatographic analysis indicated the degree of catalytic activity possessed by the copper-exchanged sodium Type X structured zeolite. This catalytic activity was thought to be primarily due to polymerization reactions of the decene-1 olefins with a small part of the decene-1 olefin being isomerized to other internal olefinic isomers. The relative activity scale used to determine the catalytic activity of this sorbent was directly measured by measuring the peak height on the chromatograph equivalent to 16 volume percent olefin as indicative of a zero catalytic activity. Hence, on the scale used in this specification, a peak height of 16 represents 16 volume percent decene-1 percent in the effluent material leaving the sorbent chamber and represents a zero catalytic activity of the sorbent. A peak height of 8 would represent, as measured by the chromatograph, 8 volume percent decene-1 in the effluent stream. Therefore, a peak height of 8 would represent exactly 50 percent polymerization or isomerization of the decene-1 feed component. Equation 3 below represents the formula used to determine catalytic activity of a sorbent knowing the peak height as represented in volume percent of the decene-1 remaining in the effluent stream leaving the sorbent chamber, $$\text{Sorbent Activity} = 100 - 100\ (P/16.0) \quad (3)$$

where $P$ represents the peak height of the effluent stream measured on the chromatograph.

It is important in processes which separate olefinic hydrocarbons that the highly reactive olefins are not reacted into side products which degrade the product quality and reduce the overall yield of concentrated olefins. In instances where the feed streams contain normal olefinic hydrocarbons representing the various isomers of the particular weight olefin, the isomerization effects of the copper-exchanged sorbent are not a great impediment to the process economics where the prime consideration is the concentration of olefinic product streams. However, reduction of the polymerization activity of a copper-exchanged sorbent is very important. The polymerization, in addition to reducing the yields of olefinic hydrocarbons in comparison to the olefins in the fresh feed, also tends to degrade the sorbent. The polymerization effects are generally considered to be primarily physical impediments which can prevent the olefinic hydrocarbons from passing into the molecular sieve sorbent by plugging up the surface of the sorbent and the pores present in the structure of the sorbent. In instances where a particular isomer of a normal olefinic hydrocarbon is desired to be concentrated on a feed stream which contains primarily a single olefinic isomer, the isomerization effects become equal, if not a greater problem than the polymerization which appears to be inherently present with some isomerization activity. It is, therefore, extremely important in many instances that the catalytic activity in regard to polymerization and isomerization reactions be substantially reduced or preferably totally eliminated by proper methods of manufacture of a selected sorbent.

While reducing the temperature of the operations of the adsorption process, in which the catalytic activity is present, will substantially reduce the catalytic activity because of the associated reduction in the rate of reaction, this procedure in adsorptive separation processes employing molecular sieves in most cases is not effective because the reduction in temperature of the overall operations reduces the kinetic energy of the materials passing into and out of the sorbent. This substantially reduces the rate of exchange of feed olefins into and out of the sorbent and the desorbent material into and out of the sorbent giving, what is considered in the art, as poor breakthrough fronts which results in product contamination with feed stock and relatively high requirements of sorbent for a given throughput of olefin containing feed stock. The following examples are illustrative of the method of manufacture of the sorbent and the process employing such and are not to be construed as unduly limitations on the inventive concepts disclosed herein.

EXAMPLE 1

In this example, the dynamic testing apparatus, as previously described, was employed to determine both the catalytic activity and the adsorptive capacity of a sodium Type X zeolite. The zeolite used was of small particle size comprising generally from 20 through 40 mesh material and was placed in the sorbent chamber. The sorbent chamber was maintained at 100°C. with a suitable pressure imposed on the system to maintain liquid phase operations. Alternate streams of fresh feed and desorbent material were passed, in a programmed manner, through the sorbent chamber to effect generation of reproduceable data. After a period of time to obtain stable operations, the sorbent's adsorptive capacity was calculated from the generated data. The activity was then determined. This sorbent is represented by sieve A shown in Table I.

As will be seen in Table I, sieve A is reactive, demonstrating a relative activity of about 4.7 percent.

EXAMPLE 2

In this example, a sodium Type X zeolite similar to that tested in Example 1 was ion-exchanged wit a basic solution containing a copper complex. The basic medium copper exchange procedure was as follows. 100 ml. of 20 through 40 mesh sodium Type X zeolite was placed in a contacting chamber. A solution containing 42 grams of $Cu(NO_3)_2 \cdot 3H_2O$ and 50 ml. of 29 wt. percent ammonium hydroxide was diluted to 600 ml. volume with deionized water. The zeolite was contacted with the basic copper exchange solution at a temperature of 25°C. at a liquid hourly space velocity of about 9. After the entire 600 ml. of solution had contacted the zeolite, the exchanged zeolite was backwashed to the visual extinction of the hydrated cupric ion, air equilibrated and thereafter calcined at 500°C. for approximately 1 hour. This sorbent was then placed in the dynamic testing apparatus to determine the olefin capacity and the relative catalytic activity of the sorbent. The results of the testing are shown in Table I with the sorbent of the example labeled as sieve B.

TABLE I

| Sieve Description | Olefin Adsorption ml./40 ml. sorbent | | Relative Activity % | Peak Height 16-100% Decene-1 | Exchange Medium |
|---|---|---|---|---|---|
| | Octene-1 | Decene-1 | | | |
| A | 3.20 | 2.72 | 4.7 | 15.3 | — |
| B | 3.20 | 3.10 | 42.0 | 9.3 | Basic Medium |
| C | 2.88 | 2.70 | 0 | 16.0 | Basic Medium Followed by Hydrocarbon Treatment |

EXAMPLE 3

In this example, a sodium Type X zeolite which had been exchanged in a basic medium as described in Example 2 was contacted with a hydrocarbon-cuprous chloride mixture. The hydrocarbon contacting step was carried out using the following procedures. 100 ml. of the sieves of Example 2 (sieve B) was contacted, in a batch operation, with 240 ml. of decene-1 which had added thereto 10 grams of solid cuprous chloride. The mixture of the sieves, the decene-1 and the cuprous chloride was placed in a beaker with a magnetic stirrer at 172°C. and contacted for 1 hour. The excess decene-1 and cuprous chloride was separated from the sieve mixture. The sieves were then washed with six 100 ml. aliquots of isopentane to remove excess decene-1 and unused solid cuprous chloride. The washed sieves were then purged with nitrogen. The sieves were then tested in the dynamic testing unit. The results of the test are reported in Table I above as sieve C. As can be seen, sieve C was not at all catalytic in nature.

It can then be seen that sieve C of Table I which was ion-exchanged in a basic medium with copper and subsequently treated by a cuprous chloride-hydrocarbon treatment step was essentially unreacting. Sieves A and B both demonstrated catalytic activity as far as isomerization and polymerization reactions were concerned. It is interesting to note that Sieve C when compared to sieve A possessed substantially the same capacities as sieve A.

General operating procedures employing the basic medium copper-exchange and hydrocarbon treatment steps require that a sodium Type X zeolite be first contacted with an aqueous solution containing a copper cation. The aqueous solution can comprise any copper salt which is reasonably soluble in water and which forms a complex in a basic medium. The exchange conditions can include temperatures from about 15°C. to about 250°C. for a period of time sufficient to exchange from about 10 percent to essentially all of the sodium present in the sodium Type X zeolite. After the basic aqueous ion-exchange has gone to the degree required, the sieve is then dehydrated at conditions including a temperature from about 100°C. to about 500°C., depending on whether total or partial dehydration of the sieve is required. It is preferred to substantially dehydrate the zeolite without rendering its crystalline structure deformed because it has been found in most basic adsorptive separation processes that generally the greater dehydration of the sorbent, the greater the capacity of the sorbent for the particular species of hydrocarbon which will be adsorbed. This is generally based on the fact that the water which is driven off the zeolite during dehydration conditions is within the lattice structure of the zeolite. Consequently, total or partial dehydration renders more free volume within the zeolite which a particular hydrocarbon which is to be separated can occupy, thereby increasing the overall capacity of a zeolite.

After the preferred degree of dehydration has been accomplished, the zeolite is cooled and thereafter is subjected to the hydrocarbon treatment step. Presently, it is not understood what exactly takes place during the hydrocarbon treatment on the copper-exchanged sieve, but the effects are noticeable, and for considerations in this disclosure, the hydrocarbon treatment step is considered to be a critical step in the manufacture of a catalytically inert sorbent which has reasonable capacity for olefinic hydrocarbons. The treatment step is accomplished by contacting the previously-exchanged and dehydrated molecular sieve with a hydrocarbon stream which is intimately mixed with a cuprous salt. The temperature conditions of the hydrocarbon treatment step can vary from about 50°F. up to about boiling point of the particular hydrocarbon employed in the treatment step. Sufficient pressures should be maintained on the system when the hydrocarbon treatment step is taking place to maintain the hydrocarbon in substantially liquid form, should the temperature of the treatment step exceed the atmospheric boiling point of the hydrocarbon used. Hydrocarbons which may be used for the hydrocarbon treatment step include olefinic hydrocarbons or any other hydrocarbon which will form a soluble complex cuprous salt and which should necessarily be capable of passing within the pore openings of a copper-exchanged Type X zeolite. Cuprous salts which may be used in the hydrocarbon treatment preferably should include cuprous chloride. Other copper salts which may be used in the hydrocarbon treatment include cuprous bromide, cuprous cyanide, cuprous chloride, cuprous thiocyanide, etc.

PREFERRED EMBODIMENTS

An embodiment of this invention resides in the method for preparing a copper-exchanged Type X structured zeolite which method comprises the steps of contacting a sodium form Type X structured zeolite in an aqueous solution of a water-soluble copper salt maintained at basic ion-exchange conditions to effect replacement of a portion or all of the sodium within the zeolite by copper cations, heating the zeolite to dehydration conditions to effect at least a partial dehydration of the zeolite and contacting the zeolite with a hydrocarbon mixture comprising a hydrocarbon and a cuprous salt at elevated temperature.

Another embodiment of the invention resides in a process for the separation of olefins from a hydrocarbon feed stream comprising olefins and saturated hydrocarbons, which process comprises the steps of contacting said feed mixture with a bed of a zeolite sorbent at adsorption conditions to effect retention of said olefins by said sorbent, withdrawing from said bed of sorbent a raffinate stream comprising saturated hydrocarbons, contacting the adsorbent bed with a desorbent material at desorption conditions to effect the desorption of said olefins from said sorbent and withdrawing a stream containing olefins and desorbent, the process further characterized in that an improvement resides in employing a zeolite produced by an aqueous basic copper ion-exchanged step followed by treatment of the sieves from the mixture of a hydrocarbon and a cuprous salt.

Another embodiment of this invention resides in a composition of matter having copper disposed on a crystalline aluminosilicate zeolite.

I claim as my invention:

1. In a process for the separation of olefins from a hydrocarbon feed mixture comprising olefins and saturated hydrocarbons which process comprises the steps of:

a. contacting said feed mixture with a bed of a zeolite sorbent at adsorption conditions to effect the selective retention of said olefins by said sorbent;
b. withdrawing from said bed of sorbent a raffinate stream comprising less selectively-retained saturated hydrocarbons;
c. contacting the sorbent bed with a desorbent material at desorption conditions to effect desorption of said olefins from said sorbent;
d. withdrawing a stream containing olefins and desorbent from said bed of sorbent; wherein an improvement comprises employing a zeolite sorbent prepared by the steps of:
  a. contacting a sodium form Type X structured zeolite with an aqueous solution of a water-soluble copper salt at ion-exchanged conditions including basic ion-exchanged medium to effect the replacement of a portion of the sodium by copper;
  b. dehydrated at least a portion of said zeolite by heating at dehydration conditions; and,
  c. contacting the said zeolite with a mixture comprising a hydrocarbon and a cuprous salt, said hydrocarbon being capable of forming a soluble complex with the cuprous salt and passing within the pore openings of said zeolite.

2. The process of claim 1 further characterized in that said hydrocarbon feed contains olefins having from about six to 20 carbon atoms per molecule.

3. The process of claim 1 further characterized in that said adsorption and desorption conditions include temperatures within the range of from about 25°C. to about 150°C. and pressures within the range of from about atmospheric to about 500 psig.

4. The process of claim 3 further characterized in that said adsorption and desorption conditions are effected in liquid phase.

5. The process of claim 1 further characterized in that said mixture comprising a hydrocarbon and a cuprous salt contains an olefinic hydrocarbon.

* * * * *